(12) United States Patent
Ostdiek

(10) Patent No.: US 11,492,918 B1
(45) Date of Patent: Nov. 8, 2022

(54) GAS TURBINE ENGINE WITH THIRD STREAM

(71) Applicant: General Electric Company, Schenectady, NY (US)

(72) Inventor: David Marion Ostdiek, Liberty Township, OH (US)

(73) Assignee: General Electric Company, Schenectady, NY (US)

(*) Notice: Subject to any disclaimer, the term of this patent is extended or adjusted under 35 U.S.C. 154(b) by 86 days.

(21) Appl. No.: 17/486,277

(22) Filed: Sep. 27, 2021

Related U.S. Application Data

(60) Provisional application No. 63/240,796, filed on Sep. 3, 2021.

(51) Int. Cl.
| | | |
|---|---|---|
| *F01D 25/24* | (2006.01) | |
| *F01D 9/04* | (2006.01) | |
| *F02K 3/077* | (2006.01) | |

(52) U.S. Cl.
CPC .............. *F01D 9/041* (2013.01); *F02K 3/077* (2013.01); *F05D 2200/12* (2013.01);
(Continued)

(58) Field of Classification Search
CPC ........ F01D 9/041; F01D 11/162; F01D 25/12; F01D 25/24; F05D 2250/90;
(Continued)

(56) References Cited

U.S. PATENT DOCUMENTS

| | | | |
|---|---|---|---|
| 2,999,630 A | 9/1961 | Warren et al. | |
| 3,540,682 A * | 11/1970 | Ferguson | .................. F02C 7/20 60/797 |

(Continued)

FOREIGN PATENT DOCUMENTS

| | | |
|---|---|---|
| CN | 1204005 A | 1/1999 |
| CN | 101657607 A | 2/2010 |

(Continued)

OTHER PUBLICATIONS

Crigler, Application of Theodorsen's Theory to Propeller Design, NACA (National Advisory Committee for Aeronautics) Report 924, 1948, pp. 83-99.

(Continued)

*Primary Examiner* — Ninh H. Nguyen
(74) *Attorney, Agent, or Firm* — Dority & Manning, P.A.

(57) ABSTRACT

A gas turbine engine defining a centerline and a circumferential direction, the gas turbine engine including: a turbomachine comprising a compressor section, a combustion section, and a turbine section arranged in serial flow order, the turbomachine defining a working gas flowpath and a fan duct flowpath; a primary fan driven by the turbomachine defining a primary fan tip radius $R_1$ and a primary fan hub radius $R_2$; a secondary fan located downstream of the primary fan and driven by the turbomachine, at least a portion of an airflow from the primary fan configured to bypass the secondary fan, the secondary fan defining a secondary fan tip radius $R_3$ and a secondary fan hub radius $R_4$, wherein the secondary fan is configured to provide a fan duct airflow through the fan duct flowpath during operation to generate a fan duct thrust, wherein the fan duct thrust is equal to % $Fn_{3S}$ of a total engine thrust during operation of the gas turbine engine at a rated speed during standard day operating conditions; wherein a ratio of $R_1$ to $R_3$ equals $$\sqrt{(EFP)\frac{\left(1-RqR_{Sec.-Fan}^2\right)}{\left(1-RqR_{Prim.-Fan}^2\right)}\left(\frac{1}{\%\ Fn_{3S}}-1\right)};$$

(Continued)

wherein EFP is between 1.5 and 11, wherein $RqR_{Prim.-Fan}$ is a ratio of $R_1$ to $R_2$, and wherein $RqR_{Sec.-Fan}$ is a ratio of $R_3$ to $R_4$.

21 Claims, 6 Drawing Sheets

(52) U.S. Cl.
CPC .... *F05D 2200/14* (2013.01); *F05D 2200/211* (2013.01); *F05D 2200/221* (2013.01); *F05D 2240/128* (2013.01); *F05D 2250/90* (2013.01); *F05D 2260/213* (2013.01); *F05D 2260/606* (2013.01)

(58) Field of Classification Search
CPC ........ F05D 2260/213; F02C 7/04; F02D 1/06; F02D 3/06; F02D 3/077
See application file for complete search history.

(56) References Cited

U.S. PATENT DOCUMENTS

| | | | |
|---|---|---|---|
| 3,542,152 A | 11/1970 | Adamson et al. | |
| 3,750,402 A | 8/1973 | Vdoviak et al. | |
| 4,010,608 A | 3/1977 | Simmons | |
| 4,043,121 A | 8/1977 | Thomas et al. | |
| 4,486,146 A | 12/1984 | Campion | |
| 4,569,199 A | 2/1986 | Klees et al. | |
| 4,607,657 A | 8/1986 | Hirschkron | |
| 4,784,575 A | 11/1988 | Nelson et al. | |
| 4,860,537 A | 8/1989 | Taylor | |
| 4,892,269 A | 1/1990 | Greco et al. | |
| 4,907,946 A | 3/1990 | Ciokajlo et al. | |
| 4,916,894 A | 4/1990 | Adamson et al. | |
| 4,976,102 A | 12/1990 | Taylor | |
| 5,054,998 A | 10/1991 | Davenport | |
| 5,190,441 A | 3/1993 | Murphy et al. | |
| 5,197,855 A | 3/1993 | Magliozzi et al. | |
| 5,259,187 A | 11/1993 | Dunbar et al. | |
| 5,261,227 A * | 11/1993 | Giffin, III | F01D 17/162 60/226.3 |
| 5,345,760 A | 9/1994 | Giffin, III | |
| 5,457,346 A | 10/1995 | Blumberg et al. | |
| 5,950,308 A | 9/1999 | Koff et al. | |
| 6,339,927 B1 | 1/2002 | DiPietro, Jr. | |
| 6,547,518 B1 | 4/2003 | Czachor et al. | |
| 6,763,654 B2 | 7/2004 | Orlando et al. | |
| 6,792,758 B2 | 9/2004 | Dowman | |
| 7,559,191 B2 | 7/2009 | Parks | |
| 7,762,766 B2 | 7/2010 | Shteyman et al. | |
| 8,276,392 B2 | 10/2012 | van der Woude | |
| 8,382,430 B2 | 2/2013 | Parry et al. | |
| 8,459,035 B2 | 6/2013 | Smith et al. | |
| 8,689,538 B2 | 4/2014 | Sankrithi et al. | |
| 8,762,766 B2 | 6/2014 | Ferguson et al. | |
| 8,876,465 B2 | 11/2014 | Stretton | |
| 8,910,465 B2 * | 12/2014 | Snyder | F02K 3/115 60/785 |
| 8,943,796 B2 | 2/2015 | McCaffrey | |
| 8,967,967 B2 | 3/2015 | Stretton et al. | |
| 9,045,996 B2 | 6/2015 | Anghel et al. | |
| 9,057,328 B2 * | 6/2015 | Kupratis | F02C 9/20 |
| 9,096,312 B2 | 8/2015 | Moxon | |
| 9,097,134 B2 | 8/2015 | Ferch et al. | |
| 9,534,538 B1 | 1/2017 | Cerny | |
| 9,982,555 B2 | 5/2018 | Thet et al. | |
| 9,995,314 B2 | 6/2018 | Miller et al. | |
| 10,077,660 B2 | 9/2018 | Hoefer et al. | |
| 10,090,676 B2 | 10/2018 | Knowles et al. | |
| 10,126,062 B2 | 11/2018 | Cerny et al. | |
| 10,184,400 B2 | 1/2019 | Cerny et al. | |
| 10,202,865 B2 | 2/2019 | Breeze-Stringfellow et al. | |
| 10,253,648 B2 | 4/2019 | Bentley et al. | |
| 10,260,419 B2 | 4/2019 | Cerny et al. | |
| 10,263,550 B2 | 4/2019 | Thet et al. | |
| 10,344,674 B2 | 7/2019 | Cerny et al. | |
| 10,364,750 B2 | 7/2019 | Rambo | |
| 10,443,436 B2 | 10/2019 | Miller et al. | |
| 10,487,739 B2 | 11/2019 | Miller et al. | |
| 10,644,630 B2 | 5/2020 | Smith et al. | |
| 2004/0197187 A1 | 10/2004 | Usab et al. | |
| 2004/0234372 A1 | 11/2004 | Shahpar | |
| 2005/0109012 A1 | 5/2005 | Johnson | |
| 2005/0241292 A1 | 11/2005 | Taylor et al. | |
| 2007/0186535 A1 | 8/2007 | Powell et al. | |
| 2007/0251212 A1 | 11/2007 | Tester | |
| 2009/0078819 A1 | 3/2009 | Guering et al. | |
| 2010/0014977 A1 | 1/2010 | Shattuck | |
| 2010/0111674 A1 | 5/2010 | Sparks | |
| 2010/0251726 A1 | 10/2010 | Jones et al. | |
| 2010/0326050 A1 | 12/2010 | Schilling et al. | |
| 2010/0329856 A1 | 12/2010 | Hofer et al. | |
| 2011/0150659 A1 | 6/2011 | Micheli et al. | |
| 2011/0192166 A1 | 8/2011 | Mulcaire | |
| 2012/0177493 A1 | 7/2012 | Fabre | |
| 2013/0098050 A1 | 4/2013 | Kupratis | |
| 2013/0104521 A1 | 5/2013 | Kupratis | |
| 2013/0104522 A1 | 5/2013 | Kupratis | |
| 2013/0104560 A1 | 5/2013 | Kupratis | |
| 2014/0133982 A1 | 5/2014 | Dejeu et al. | |
| 2014/0345253 A1 | 11/2014 | Dawson et al. | |
| 2014/0345254 A1 | 11/2014 | Dawson et al. | |
| 2015/0003993 A1 | 1/2015 | Kim et al. | |
| 2015/0098813 A1 | 4/2015 | Jarrett, Jr. | |
| 2015/0284070 A1 | 10/2015 | Breeze-Stringfellow et al. | |
| 2015/0291276 A1 | 10/2015 | Zatorski et al. | |
| 2016/0010487 A1 | 1/2016 | Breeze-Stringfellow et al. | |
| 2016/0160647 A1 | 6/2016 | Hofer et al. | |
| 2016/0230658 A1 | 8/2016 | Hanlon et al. | |
| 2017/0051678 A1 | 2/2017 | Becker, Jr. | |
| 2017/0051680 A1 | 2/2017 | Becker, Jr. et al. | |
| 2017/0102006 A1 | 4/2017 | Miller et al. | |
| 2017/0114721 A1 | 4/2017 | Miller et al. | |
| 2017/0167382 A1 | 6/2017 | Miller et al. | |
| 2017/0184027 A1 | 6/2017 | Moniz et al. | |
| 2017/0198719 A1 | 7/2017 | Cerny et al. | |
| 2018/0065727 A1 | 3/2018 | Gruber et al. | |
| 2018/0118364 A1 | 5/2018 | Golshany et al. | |
| 2018/0215475 A1 | 8/2018 | Hurt et al. | |
| 2018/0283795 A1 | 10/2018 | Cerny et al. | |
| 2019/0136710 A1 | 5/2019 | Breeze-Stringfellow et al. | |
| 2019/0153952 A1 | 5/2019 | Niergarth et al. | |
| 2019/0153953 A1 | 5/2019 | Niergarth et al. | |
| 2019/0218971 A1 | 7/2019 | Niergarth et al. | |
| 2019/0249599 A1 | 8/2019 | Sen et al. | |
| 2019/0257247 A1 | 8/2019 | Pal et al. | |
| 2019/0360401 A1 | 11/2019 | Rambo et al. | |
| 2020/0095939 A1 | 3/2020 | Epstein | |
| 2021/0108573 A1 | 4/2021 | Sibbach et al. | |
| 2021/0108597 A1 | 4/2021 | Ostdiek et al. | |

FOREIGN PATENT DOCUMENTS

| | | |
|---|---|---|
| DE | 1081277 B | 5/1960 |
| EP | 0385913 A1 | 9/1990 |
| EP | 0887259 A2 | 12/1998 |
| EP | 1493900 A2 | 1/2005 |
| EP | 1988274 A2 | 11/2008 |
| EP | 2540989 A2 | 1/2013 |
| EP | 2562082 A2 | 2/2013 |
| EP | 3093443 A1 | 11/2016 |
| GB | 2100799 A | 1/1983 |
| GB | 2196390 A | 4/1988 |
| GB | 2461811 A | 1/2010 |
| JP | H0370698 A | 3/1991 |
| JP | 2006123880 A | 5/2006 |
| JP | 2009508748 A | 3/2009 |
| JP | 2011527263 A | 10/2011 |
| KR | 101179277 B1 | 9/2012 |
| WO | WO2004/033295 A1 | 4/2004 |
| WO | WO2005/111413 A1 | 11/2005 |
| WO | WO2011/020458 A2 | 2/2011 |

(56) References Cited

FOREIGN PATENT DOCUMENTS

| | | |
|---|---|---|
| WO | WO2011/094477 A2 | 8/2011 |
| WO | WO2011/107320 A1 | 9/2011 |
| WO | WO2014/143248 A1 | 9/2014 |

OTHER PUBLICATIONS

Naveen et al., CFD Analysis of Low Pressure Turbine Blade Using Vortex Generator Jets, Proceedings of $7^{th}$ International Conference on Intelligent Systems and Control (ISCO 2013) IEEE Explore, Coimbatore, Tamil Nadu, India, Jan. 4-5, 2013, pp. 541-544. https://ieeexplore.ieee.org/document/6481213.
Smith Jr, Unducted Fan Aerodynamic Design, Journal of Turbomachinery, vol. 109, Jul. 1987, pp. 313-324.
Theodorsen, Theory of Propellers, Wartime Report, NACA (National Advisory Committee for Aeronautics), Aug. 1944, pp. 1-53.
Yamamoto et al., Numerical Calculation of Propfan/Swirl Recovery Vane Flow Field, AIAA-92-3771, AIAA//SAE/ASME/ASEE 28th Joint Propulsion Conference and Exhibit, Jul. 6-8, 1992, Nashville TN, pp. 1-9.

\* cited by examiner

| Vc TIP PRIM.-FAN | RqR PRIM. FAN | Vc TIP SEC. FAN | RqR SEC.- FAN | EFP | R1/R3 | % 3rd STREAM |
|---|---|---|---|---|---|---|
| 740 | 0.34 | 1900 | 0.63 | 1.601 | 4.6 | 5% |
| 740 | 0.25 | 1900 | 0.80 | 1.601 | 3.4 | 5% |
| 740 | 0.34 | 1900 | 0.40 | 1.601 | 5.4 | 5% |
| 740 | 0.34 | 1900 | 0.63 | 1.601 | 3.1 | 10% |
| 740 | 0.25 | 1900 | 0.80 | 1.601 | 2.4 | 10% |
| 740 | 0.34 | 1900 | 0.40 | 1.601 | 3.7 | 10% |
| 740 | 0.34 | 1900 | 0.63 | 1.601 | 2.5 | 15% |
| 740 | 0.34 | 1900 | 0.40 | 1.601 | 2.9 | 15% |
| 740 | 0.34 | 1900 | 0.63 | 1.601 | 2.1 | 20% |
| 740 | 0.34 | 1900 | 0.40 | 1.601 | 2.5 | 20% |
| 1200 | 0.34 | 1530 | 0.63 | 1.736 | 4.7 | 5% |
| 1200 | 0.25 | 1530 | 0.80 | 1.736 | 3.6 | 5% |
| 1200 | 0.34 | 1530 | 0.40 | 1.736 | 5.6 | 5% |
| 1200 | 0.34 | 1530 | 0.63 | 1.736 | 3.3 | 10% |
| 1200 | 0.25 | 1530 | 0.80 | 1.736 | 2.4 | 10% |
| 1200 | 0.34 | 1530 | 0.40 | 1.736 | 3.9 | 10% |
| 1200 | 0.34 | 1530 | 0.63 | 1.736 | 2.6 | 15% |
| 1200 | 0.34 | 1530 | 0.40 | 1.736 | 3.1 | 15% |
| 1200 | 0.34 | 1530 | 0.63 | 1.736 | 2.2 | 20% |
| 1200 | 0.34 | 1530 | 0.40 | 1.736 | 2.6 | 20% |
| 740 | 0.34 | 1300 | 0.63 | 1.926 | 5.0 | 5% |
| 740 | 0.25 | 1300 | 0.80 | 1.926 | 3.7 | 5% |
| 740 | 0.34 | 1300 | 0.40 | 1.926 | 5.9 | 5% |
| 740 | 0.34 | 1300 | 0.63 | 1.926 | 3.4 | 10% |
| 740 | 0.25 | 1300 | 0.80 | 1.926 | 2.6 | 10% |
| 740 | 0.34 | 1300 | 0.40 | 1.926 | 4.1 | 10% |
| 740 | 0.34 | 1300 | 0.63 | 1.926 | 2.7 | 15% |
| 740 | 0.25 | 1300 | 0.80 | 1.926 | 2.0 | 15% |
| 740 | 0.34 | 1300 | 0.40 | 1.926 | 3.2 | 15% |
| 740 | 0.34 | 1300 | 0.63 | 1.926 | 2.3 | 20% |
| 740 | 0.34 | 1300 | 0.40 | 1.926 | 2.7 | 20% |
| 740 | 0.34 | 1300 | 0.40 | 1.926 | 2.1 | 30% |
| 1200 | 0.34 | 1900 | 0.63 | 2.084 | 5.2 | 5% |
| 1200 | 0.25 | 1900 | 0.80 | 2.084 | 3.9 | 5% |
| 1200 | 0.34 | 1900 | 0.40 | 2.084 | 6.1 | 5% |
| 1200 | 0.34 | 1900 | 0.63 | 2.084 | 3.6 | 10% |
| 1200 | 0.25 | 1900 | 0.80 | 2.084 | 2.7 | 10% |
| 1200 | 0.34 | 1900 | 0.40 | 2.084 | 4.2 | 10% |
| 1200 | 0.34 | 1900 | 0.63 | 2.084 | 2.8 | 15% |
| 1200 | 0.25 | 1900 | 0.80 | 2.084 | 2.1 | 15% |
| 1200 | 0.34 | 1900 | 0.40 | 2.084 | 3.3 | 15% |
| 1200 | 0.34 | 1900 | 0.63 | 2.084 | 2.4 | 20% |
| 1200 | 0.34 | 1900 | 0.40 | 2.084 | 2.8 | 20% |
| 1200 | 0.34 | 1900 | 0.40 | 2.084 | 2.1 | 30% |
| 1400 | 0.34 | 1900 | 0.63 | 2.436 | 5.6 | 5% |

FIG. 2A

| Vc TIP PRIM.-FAN | RqR PRIM. FAN | Vc TIP SEC. FAN | RqR SEC.-FAN | EFP | R1/R3 | % 3rd STREAM |
|---|---|---|---|---|---|---|
| 1400 | 0.25 | 1900 | 0.80 | 2.436 | 4.2 | 5% |
| 1400 | 0.34 | 1900 | 0.40 | 2.436 | 6.6 | 5% |
| 1400 | 0.34 | 1900 | 0.63 | 2.436 | 3.9 | 10% |
| 1400 | 0.25 | 1900 | 0.80 | 2.436 | 2.9 | 10% |
| 1400 | 0.34 | 1900 | 0.40 | 2.436 | 4.6 | 10% |
| 1400 | 0.34 | 1900 | 0.63 | 2.436 | 3.1 | 15% |
| 1400 | 0.25 | 1900 | 0.80 | 2.436 | 2.3 | 15% |
| 1400 | 0.34 | 1900 | 0.40 | 2.436 | 3.6 | 15% |
| 1400 | 0.34 | 1900 | 0.63 | 2.436 | 2.6 | 20% |
| 1400 | 0.34 | 1900 | 0.40 | 2.436 | 3.0 | 20% |
| 1400 | 0.34 | 1900 | 0.40 | 2.436 | 2.3 | 30% |
| 740 | 0.27 | 1530 | 0.63 | 2.795 | 3.8 | 11% |
| 740 | 0.27 | 1530 | 0.63 | 2.855 | 3.9 | 11% |
| 740 | 0.34 | 1300 | 0.63 | 3.018 | 6.3 | 5% |
| 740 | 0.25 | 1300 | 0.80 | 3.018 | 4.7 | 5% |
| 740 | 0.34 | 1300 | 0.63 | 3.018 | 4.3 | 10% |
| 740 | 0.25 | 1300 | 0.80 | 3.018 | 3.2 | 10% |
| 740 | 0.34 | 1300 | 0.40 | 3.018 | 5.1 | 10% |
| 740 | 0.34 | 1300 | 0.63 | 3.018 | 3.4 | 15% |
| 740 | 0.25 | 1300 | 0.80 | 3.018 | 2.6 | 15% |
| 740 | 0.34 | 1300 | 0.40 | 3.018 | 4.0 | 15% |
| 740 | 0.34 | 1300 | 0.63 | 3.018 | 2.9 | 20% |
| 740 | 0.25 | 1300 | 0.80 | 3.018 | 2.2 | 20% |
| 740 | 0.34 | 1300 | 0.40 | 3.018 | 3.4 | 20% |
| 740 | 0.34 | 1300 | 0.63 | 3.018 | 2.2 | 30% |
| 740 | 0.34 | 1300 | 0.40 | 3.018 | 2.6 | 30% |
| 740 | 0.34 | 1300 | 0.40 | 3.018 | 2.1 | 40% |
| 740 | 0.34 | 1530 | 0.63 | 3.169 | 4.2 | 11% |
| 740 | 0.35 | 1530 | 0.63 | 3.169 | 4.2 | 11% |
| 740 | 0.27 | 1530 | 0.50 | 3.169 | 4.6 | 11% |
| 740 | 0.27 | 1530 | 0.63 | 3.169 | 6.3 | 5% |
| 740 | 0.27 | 1530 | 0.63 | 3.169 | 3.4 | 15% |
| 740 | 0.34 | 1530 | 0.63 | 3.169 | 5.4 | 7% |
| 740 | 0.36 | 1530 | 0.55 | 3.169 | 4.3 | 12% |
| 740 | 0.38 | 1530 | 0.50 | 3.169 | 4.0 | 15% |
| 740 | 0.42 | 1530 | 0.45 | 3.169 | 3.5 | 20% |
| 740 | 0.42 | 1530 | 0.40 | 3.169 | 3.1 | 25% |
| 740 | 0.34 | 1530 | 0.63 | 3.169 | 6.4 | 5% |
| 740 | 0.25 | 1530 | 0.80 | 3.169 | 4.8 | 5% |
| 740 | 0.34 | 1530 | 0.63 | 3.169 | 4.4 | 10% |
| 740 | 0.25 | 1530 | 0.80 | 3.169 | 3.3 | 10% |
| 740 | 0.34 | 1530 | 0.40 | 3.169 | 5.2 | 10% |
| 740 | 0.34 | 1530 | 0.63 | 3.169 | 3.5 | 15% |
| 740 | 0.25 | 1530 | 0.80 | 3.169 | 2.6 | 15% |
| 740 | 0.34 | 1530 | 0.40 | 3.169 | 4.1 | 15% |

FIG. 2B

| Vc TIP PRIM.-FAN | RqR PRIM. FAN | Vc TIP SEC. FAN | RqR SEC.- FAN | EFP | R1/R3 | % 3rd STREAM |
|---|---|---|---|---|---|---|
| 740 | 0.34 | 1530 | 0.63 | 3.169 | 2.9 | 20% |
| 740 | 0.25 | 1530 | 0.80 | 3.169 | 2.2 | 20% |
| 740 | 0.34 | 1530 | 0.40 | 3.169 | 3.5 | 20% |
| 740 | 0.34 | 1530 | 0.63 | 3.169 | 2.2 | 30% |
| 740 | 0.34 | 1530 | 0.40 | 3.169 | 2.7 | 30% |
| 740 | 0.34 | 1530 | 0.40 | 3.169 | 2.1 | 40% |
| 1200 | 0.34 | 1900 | 0.63 | 3.639 | 6.9 | 5% |
| 1200 | 0.25 | 1900 | 0.80 | 3.639 | 5.2 | 5% |
| 1200 | 0.34 | 1900 | 0.63 | 3.639 | 4.7 | 10% |
| 1200 | 0.25 | 1900 | 0.80 | 3.639 | 3.5 | 10% |
| 1200 | 0.34 | 1900 | 0.40 | 3.639 | 5.6 | 10% |
| 1200 | 0.34 | 1900 | 0.63 | 3.639 | 3.8 | 15% |
| 1200 | 0.25 | 1900 | 0.80 | 3.639 | 2.8 | 15% |
| 1200 | 0.34 | 1900 | 0.40 | 3.639 | 4.4 | 15% |
| 1200 | 0.34 | 1900 | 0.63 | 3.639 | 3.2 | 20% |
| 1200 | 0.25 | 1900 | 0.80 | 3.639 | 2.4 | 20% |
| 1200 | 0.34 | 1900 | 0.40 | 3.639 | 3.7 | 20% |
| 1200 | 0.34 | 1900 | 0.63 | 3.639 | 2.4 | 30% |
| 1200 | 0.34 | 1900 | 0.40 | 3.639 | 2.8 | 30% |
| 1200 | 0.34 | 1900 | 0.40 | 3.639 | 2.3 | 40% |
| 740 | 0.25 | 1530 | 0.80 | 5.040 | 6.1 | 5% |
| 740 | 0.34 | 1530 | 0.63 | 5.040 | 5.6 | 10% |
| 740 | 0.25 | 1530 | 0.80 | 5.040 | 4.2 | 10% |
| 740 | 0.34 | 1530 | 0.40 | 5.040 | 6.6 | 10% |
| 740 | 0.34 | 1530 | 0.63 | 5.040 | 4.4 | 15% |
| 740 | 0.25 | 1530 | 0.80 | 5.040 | 3.3 | 15% |
| 740 | 0.34 | 1530 | 0.40 | 5.040 | 5.2 | 15% |
| 740 | 0.34 | 1530 | 0.63 | 5.040 | 3.7 | 20% |
| 740 | 0.25 | 1530 | 0.80 | 5.040 | 2.8 | 20% |
| 740 | 0.34 | 1530 | 0.40 | 5.040 | 4.4 | 20% |
| 740 | 0.34 | 1530 | 0.63 | 5.040 | 2.8 | 30% |
| 740 | 0.25 | 1530 | 0.80 | 5.040 | 2.1 | 30% |
| 740 | 0.34 | 1530 | 0.40 | 5.040 | 3.3 | 30% |
| 740 | 0.34 | 1530 | 0.63 | 5.040 | 2.3 | 40% |
| 740 | 0.34 | 1530 | 0.40 | 5.040 | 2.7 | 40% |
| 740 | 0.34 | 1530 | 0.40 | 5.040 | 2.2 | 50% |
| 740 | 0.25 | 1900 | 0.80 | 6.491 | 6.9 | 5% |
| 740 | 0.34 | 1900 | 0.63 | 6.491 | 6.3 | 10% |
| 740 | 0.25 | 1900 | 0.80 | 6.491 | 4.7 | 10% |
| 740 | 0.34 | 1900 | 0.63 | 6.491 | 5.0 | 15% |
| 740 | 0.25 | 1900 | 0.80 | 6.491 | 3.8 | 15% |
| 740 | 0.34 | 1900 | 0.40 | 6.491 | 5.9 | 15% |
| 740 | 0.34 | 1900 | 0.63 | 6.491 | 4.2 | 20% |
| 740 | 0.25 | 1900 | 0.80 | 6.491 | 3.2 | 20% |
| 740 | 0.34 | 1900 | 0.40 | 6.491 | 5.0 | 20% |

FIG. 2C

| Vc TIP PRIM.-FAN | RqR PRIM. FAN | Vc TIP SEC. FAN | RqR SEC.-FAN | EFP | R1/R3 | % 3rd STREAM |
|---|---|---|---|---|---|---|
| 740 | 0.34 | 1900 | 0.63 | 6.491 | 3.2 | 30% |
| 740 | 0.25 | 1900 | 0.80 | 6.491 | 2.4 | 30% |
| 740 | 0.34 | 1900 | 0.40 | 6.491 | 3.8 | 30% |
| 740 | 0.34 | 1900 | 0.63 | 6.491 | 2.6 | 40% |
| 740 | 0.34 | 1900 | 0.40 | 6.491 | 3.0 | 40% |
| 740 | 0.34 | 1900 | 0.63 | 6.491 | 2.1 | 50% |
| 740 | 0.34 | 1900 | 0.40 | 6.491 | 2.5 | 50% |
| 740 | 0.25 | 1900 | 0.80 | 10.565 | 6.0 | 10% |
| 740 | 0.34 | 1900 | 0.63 | 10.565 | 6.4 | 15% |
| 740 | 0.25 | 1900 | 0.80 | 10.565 | 4.8 | 15% |
| 740 | 0.34 | 1900 | 0.63 | 10.565 | 5.4 | 20% |
| 740 | 0.25 | 1900 | 0.80 | 10.565 | 4.0 | 20% |
| 740 | 0.34 | 1900 | 0.40 | 10.565 | 6.3 | 20% |
| 740 | 0.34 | 1900 | 0.63 | 10.565 | 4.1 | 30% |
| 740 | 0.25 | 1900 | 0.80 | 10.565 | 3.1 | 30% |
| 740 | 0.34 | 1900 | 0.40 | 10.565 | 4.8 | 30% |
| 740 | 0.34 | 1900 | 0.63 | 10.565 | 3.3 | 40% |
| 740 | 0.25 | 1900 | 0.80 | 10.565 | 2.5 | 40% |
| 740 | 0.34 | 1900 | 0.40 | 10.565 | 3.9 | 40% |
| 740 | 0.34 | 1900 | 0.63 | 10.565 | 2.7 | 50% |
| 740 | 0.25 | 1900 | 0.80 | 10.565 | 2.0 | 50% |
| 740 | 0.34 | 1900 | 0.40 | 10.565 | 3.2 | 50% |

FIG. 2D

GAS TURBINE ENGINE WITH THIRD STREAM

CROSS-REFERENCE TO RELATED APPLICATIONS

This application is a non-provisional application claiming the benefit of priority under 35 U.S.C. § 119(e) to U.S. Provisional Application No. 63/240,796, filed Sep. 3, 2021, which is hereby incorporated by reference in its entirety.

FIELD

The present disclosure relates to a gas turbine engine with a third stream.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIGS. 2A through 2D is a table of example embodiments of the present disclosure.

DETAILED DESCRIPTION

Figure 1:
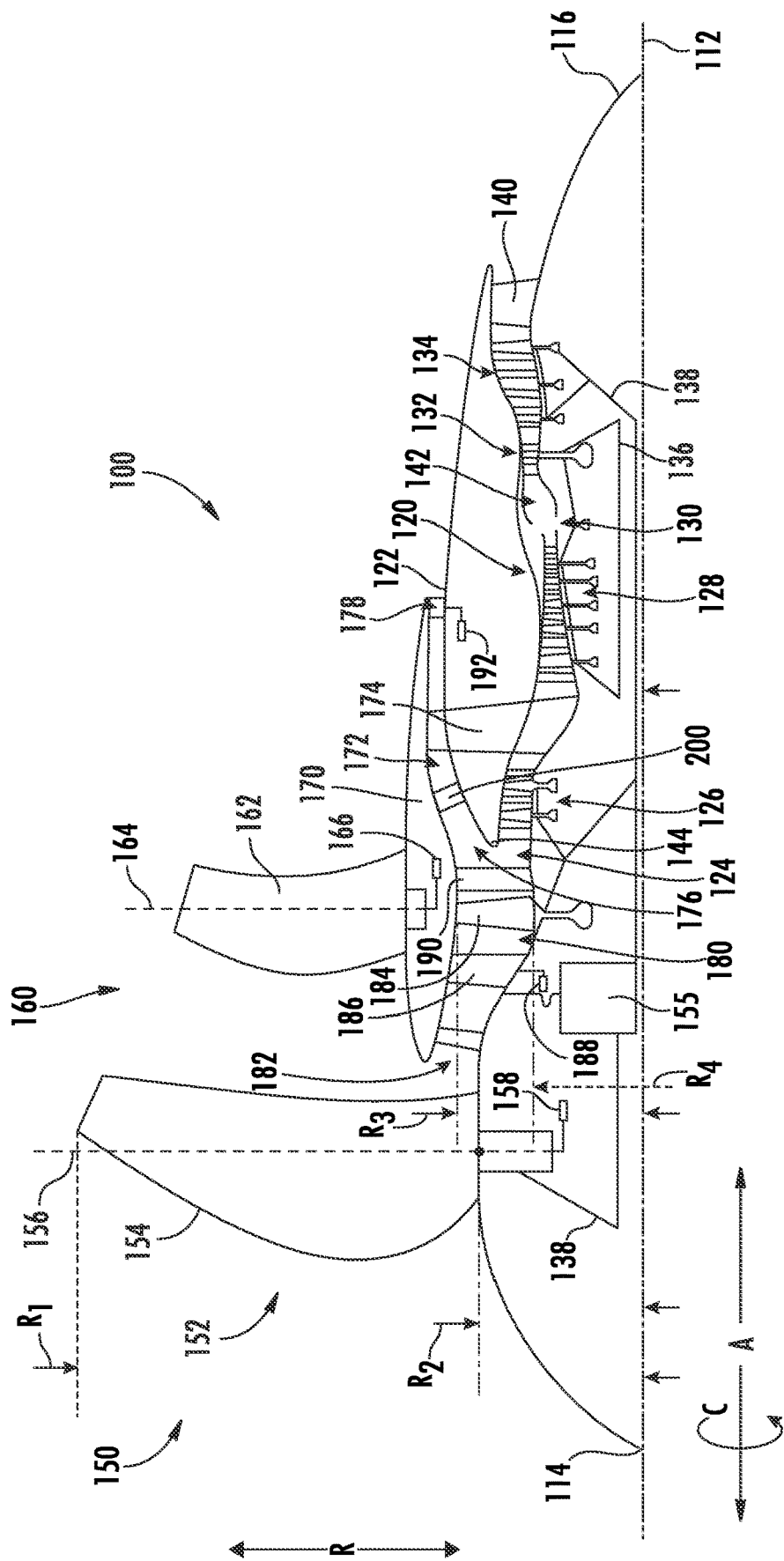
FIG. 1 is a schematic cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "disk loading" refers to an average pressure change across a plurality of rotor blades of a rotor assembly, such as the average pressure change across a plurality of fan blades of a fan.

The term "rated speed" refers to an operating condition of an engine whereby the engine is operating in the maximum, full load operating condition that is rated by the manufacturer.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term "bypass ratio" refers to a ratio in an engine of an amount of airflow that is bypassed around the engine's ducted inlet to the amount that passes through the engine's ducted inlet. For example, in the embodiment of FIG. 1, discussed below, the bypass ratio refers to an amount of airflow from the fan 152 that flows over the fan cowl 170 to an amount of airflow from the fan 152 that flows through the engine inlet 182.

The term "corrected tip speed," with respect to a fan having fan blades, refers to a speed of the fan blades at an outer tip of the fan blades along a radial direction, corrected to correspond to standard day conditions (i.e., the speed the fan blades at their outer tips would rotate at if the upstream temperature corresponded to standard day conditions).

Generally, a turbofan engine includes a relatively large fan to provide a desired amount of thrust without overloading the fan blades (i.e., without increasing a disk loading of the fan blades of the fan beyond a certain threshold), and therefore to maintain a desired overall propulsive efficiency for the turbofan engine. Conventional turbofan engine design practice has been to provide a large fan, or rather a high diameter fan, on the engine to provide as much of a total thrust for the turbofan engine as reasonably possible. The objective, when designing the conventional turbofan engine was to maximize a propulsive efficiency of the turbofan engine. A turbofan engine including such a large fan, however, may result in, e.g., problems packaging the turbofan engine on an aircraft, a relatively heavy turbofan engine (particularly for ducted turbofan engines), etc. Further, as the need for turbofan engines to provide more thrust continues, the thermal demands on the turbofan engines correspondingly increases.

The inventor of the present disclosure, however, found that for a three stream turbofan engine having a primary fan and a secondary fan, with the secondary fan being a ducted fan providing an airflow to a third stream of the engine, the amount of thrust generation required from the primary fan may be reduced, with the secondary fan providing the difference through the third stream. Such a configuration may maintain a desired overall propulsive efficienly for the turbofan engine, or unexpectedly may in fact increase the over propulsive efficiency of the turbofan engine.

The inventor's proceeded in the manner of designing an engine with given primary fan characteristics, secondary fan characteristics, and turbomachine characteristics; checking the propulsive efficiency of the designed turbofan engine; redesigning the turbofan engine with varying primary fan, secondary fan, and turbomachine characteristics; rechecking the propulsive efficiency of the redesigned turbofan engine; etc. during the design of several different types of turbofan engines, including the gas turbine engine described below with reference to FIG. 1. During the course of this practice of studying/evaluating various primary fan characteristics, secondary fan characteristics, and turbomachine characteristics considered feasible for best satisfying mission requirements, it was discovered that a certain relationship exists between a percentage of a total turbofan engine thrust provided by a third stream (as defined herein) and the relative sizes of a turbofan's primary to secondary fan, or more particularly a radius ratio of the primary fan to secondary fan. The resulting radius ratio to third-stream thrust relationship, as herein referred to, can be thought of as an indicator of the ability of a turbofan engine to maintain or even improve upon a desired propulsive efficiency via the third stream and, additionally, indicating an improvement in the turbofan engine's packaging concerns and weight concerns, and thermal management capabilities.

Referring now to FIG. 1, a schematic cross-sectional view of a gas turbine engine is provided according to another example embodiment of the present disclosure. Particularly, FIG. 1 provides an engine having a rotor assembly with a single stage of unducted rotor blades. In such a manner, the rotor assembly may be referred to herein as an "unducted fan," or the entire engine 100 may be referred to as an "unducted engine." In addition, the engine of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 128 drives the high pressure compressor 128 through a high pressure shaft 136. In this regard, the high pressure turbine 128 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Further, each fan blade 154 defines a fan blade tip radius $R_1$ along the radial direction R from the longitudinal axis 12 to the tip, and a hub radius (or inner radius) $R_2$ along the radial direction R from the longitudinal axis 12 to the base. Further, the fan 152, or rather each fan blade 154 of the fan 152, defines a fan radius ratio, RqR, equal to $R_1$ divided by $R_2$. As the fan 150 is the primary fan of the engine 100, the fan radius ratio, RqR, of the fan 152 may be referred to as the primary fan radius ratio, $RqR_{Prim.-Fan}$.

Moreover, each blade 154 defines a central blade axis 156. For this embodiment, each blade 154 of the fan 152 is rotatable about their respective central blades axes 156, e.g., in unison with one another. One or more actuators 158 are provided to facilitate such rotation and therefore may be used to change a pitch of the blades 154 about their respective central blades axes 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blades axes 164, e.g., in unison with one another. One or more actuators 166 are provided to facilitate such rotation and therefore may be used to change a pitch of the fan guide vane 162 about their respective central blades axes 164. However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan is rotatable at about the same axis as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1). The fan blades of the ducted fan 184 can be arranged in equal spacing around the longitudinal axis 112. Each blade of the ducted fan 184 has a root and a tip and a span defined therebetween. Further, each fan blade of the ducted fan 184 defines a fan blade tip radius $R_3$ along the radial direction R from the longitudinal axis 12 to the tip, and a hub radius (or inner radius) $R_4$ along the radial direction R from the longitudinal axis 12 to the base. Further, the ducted fan 184, or rather each fan blade of the ducted fan 184, defines a fan radius ratio, RqR, equal to $R_3$ divided by $R_4$. As the ducted fan 184 is the secondary fan of the engine 100, the fan radius ratio, RqR, of the ducted fan 184 may be referred to as the secondary fan radius ratio, $RqR_{Sec.-Fan}$.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flowpath or fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from the leading edge 144 of the core cowl 122 and may partially co-extend generally axially on opposite radial sides of the core cowl.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

During operation of the engine 100 at an operating condition, the engine 100 generates a total thrust, $Fn_{Total}$. The operating condition may be operation of the engine 100 at a rated speed during standard day operating condition. The total thrust is a sum of a first stream thrust, $Fn_{1S}$ (e.g., a primary fan thrust generated by an airflow over the fan cowl 170 and core cowl 122, generated by the fan 152), a third stream thrust, $Fn_{3S}$ (e.g., a thrust generated by an airflow through the fan duct 172 exiting through the fan exhaust nozzle 178, generated at least in part by the ducted fan 184), and a second stream thrust, $Fn_{2S}$ (e.g., a thrust generated by an airflow through the core duct 142 exiting through the exhaust nozzle 140).

Notably, for the embodiment depicted, the engine 100 includes one or more features to increase an efficiency of the third stream thrust, $Fn_{3S}$. In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the fan inlet guide vanes 186 are not rotatable about the longitudinal axis 112. Each inlet guide vanes 186 defines a central blade axis (not labeled for clarity), and is rotatable about their respective central blade axes, e.g., in unison with one another. One or more actuators 188 are provided to facilitate such rotation and therefore may be used to change a pitch of the inlet guide vanes 186 about their respective central blades axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the exhaust nozzle 178 may result in a more efficient generation of third stream thrust, $Fn_{3S}$, during one or more engine operating conditions. Further, by introducing a variability in the geometry of the inlet guide vanes 186 and the exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Referring still to FIG. 1, in exemplary embodiments, air passing through the fan duct 172 may be relatively cooler (e.g., lower temperature) than one or more fluids utilized in the turbomachine 120. In this way, one or more heat exchangers 200 may be positioned in thermal communication with the fan duct 172. For example, one or more heat exchangers 200 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 200 may be an annular heat exchanger extending substantially 360 degrees in the fan duct 172 (e.g., at least 300 degrees, such as at least 330 degrees). In such a manner, the heat exchanger 200 may effectively utilize the air passing through the fan duct 172 to cool one or more systems of the engine 100 (e.g., lubrication oil systems, compressor bleed air, electrical components, etc.). The heat exchanger 200 uses the air passing through duct 172 as a heat sink and correspondingly increases the temperature of the air downstream of the heat exchanger 200 and exiting the nozzle 178.

As alluded earlier, the inventor discovered, unexpectedly during the course of turbofan engine design—i.e., designing turbofan engines (both ducted and unducted turbofans) having a variety of different primary fan and secondary fan characteristics, both physical and operational—and evaluating an overall propulsive efficiency, a significant relationship exists between a percentage of a total turbofan engine thrust provided by a third stream (as defined herein) and the relative sizes of a turbofan's primary to secondary fan. The resulting radius ratio to third-stream thrust relationship, as herein referred to, can be thought of as an indicator of the ability of a turbofan engine to maintain or even improve upon a desired propulsive efficiency via the third stream and, additionally, indicating an improvement in the turbofan engine's packaging concerns and weight concerns, and thermal management capabilities.

As will be appreciated, higher and lower third stream thrusts change the packaging abilities of the turbofan engine and the thermal sink capabilities of the turbofan engine. For example, increased thrust from an airflow through the third stream generally means more airflow (on a mass flowrate basis) through the third stream, which in turn mean more thermal capacity for such airflow. Further, the inventor found that you provide too little thrust from the third stream, the turbofan engine may be unnecessarily large (and thus more difficult to package) and heavy, and further may not provide a desired amount of thermal sink capabilities. If you provide too much thrust through the third stream, the engine may not fully take advantage of relatively efficient thrust that may be generated by the primary fan.

The above relationship may be a function of a bypass ratio of the turbofan engine, which may generally be limited by reasonable engine temperatures, including operating temperatures, such as exhaust gas temperatures (EGT). For example, as will be appreciated in view of the foregoing teaching, a radius of the primary fan relative to a radius of the secondary fan, along with a percentage of a total turbofan engine thrust generated by an airflow through the third stream during operation, are each, in part, a function of the bypass ratio and together characterize the balancing in the relationship noted above.

Many aspects of an architecture dictate the bypass ratio of a turbofan engine. For example, the bypass ratio is, in part, a function of a corrected tip speed of the primary fan relative to a corrected tip speed the secondary fan, as well as a specific thrust of the respective primary and secondary fans. The specific thrusts of the primary and secondary fans, in turn, are a function of a pressure ratio of the primary and secondary fans, respectively, and a disk loading (also referred to as a power loading) on the primary and secondary fans, respectively. These factors also affect the balancing in the relationship noted above, as will described in more detail below with reference to an effective fan parameter, EFP.

As noted above, the inventor of the present disclosure discovered a relationship between the percentage of engine thrust configured to be provided by the airflow through the third stream and the radius ratio of the primary fan and secondary fan that can result in a turbofan engine maintaining or even improving upon a desired propulsive efficiency, while also improving the turbofan engine's packaging concerns and weight concerns, and also providing desired thermal management capabilities.

Utilizing this relationship, the inventor found that the number of suitable or feasible turbofan engine designs incorporating a primary fan and a secondary fan, and defining a third stream, capable of meeting both the propulsive efficiency requirements and packaging, weight, and thermal sink requirements could be greatly diminished, thereby facilitating a more rapid down selection of designs to consider as a turbofan engine is being developed. Such a benefit provides more insight to the requirements for a given turbofan engine well before specific technologies, integration and system requirements are developed fully. It avoids late-stage redesign. The desired relationship is represented by the following Equation (1):

$$\frac{R_1}{R_3} = \sqrt{(EFP)\frac{(1 - RqR_{Sec.-Fan}^2)}{(1 - RqR_{Prim.-Fan}^2)}\left(\frac{1}{\% \ Fn_{3S}} - 1\right)};$$ Equation (1)

where $R_1$ is a tip radius of the primary fan, $R_2$ is a hub radius of the primary fan, $R_3$ is a tip radius of the secondary fan, $R_4$ is a hub radius of the secondary fan, $RqR_{Prim.-Fan}$ is the ratio of $R_1$ to $R_2$, $RqR_{Sec.-Fan}$ is the ratio of $R_3$ to $R_4$, % $Fn_{3S}$ is the percentage of thrust through the third stream relative to a total thrust of the engine (e.g., for the embodiment of FIG. 1, $Fn_{3S}$ divided by $Fn_{Total}$), and EFP is called an effective fan parameter. For the purposes of Equation (1), % $Fn_{3S}$ is defined while operating the engine at a rated speed during standard day operating conditions.

EFP is a function of a corrected tip speed of the primary fan, a corrected tip speed of the secondary fan, a disk loading of the primary fan, and a disk loading of the secondary fan. EFP, by taking into account the corrected tip speeds of the primary and secondary fans, accounts for such factors as the specific engine configuration (e.g., geared, direct drive, etc.), which may have some influence on the relationship between tip radius ratio ($R_1$ to $R_3$) and the percent thrust through the third stream (% $Fn_{3S}$) for a turbofan engine having a desired propulsive efficiency. The relationship of these contributing factors to EFP to the tip radius ratio ($R_1$ to $R_3$) and the percent thrust through the third stream (% $Fn_{3S}$) for a turbofan engine is described in more detail above.

Values for $R_1/R_3$ and the corresponding values of the influencing characteristics of an engine defined by Equation (1) are set forth in TABLE 1:

TABLE 1

| Symbol | Description | Ranges appropriate for using Eq. (1) |
| --- | --- | --- |
| $R_1/R_3$ | Tip radius ratio | about 2 to about 10, such as about 2 to about 7, such as about 3 to about 5, such as at least 3.5, such as 3.7, such as at least 4, such as up to about 10, such as up to about 7 |
| $RqR_{Sec.-Fan}$ | Secondary fan radius ratio | about 0.2 to about 0.7, such as about 0.35 to about 0.5 |
| $RqR_{Prim.-Fan}$ | Primary fan radius ratio | about 0.2 to about 0.4, such as about 0.25 to about 0.35 |
| EFP | Effective fan parameter | about 1.5 to about 11, such as about 2 to about 4.5, such as about 2.5 to about 4, such as about 3 to about 3.5 |
| $V_C$ Prim.-Fan | Corrected primary fan tip speed | about 500 feet per second (fps) to about 2,000 fps, such as about 750 fps to about 1,750 fps |
| $V_C$ Sec.-Fan | Corrected secondary fan tip speed | about 500 feet per second (fps) to about 2,000 fps, such as about 750 fps to about 1,750 fps |
| %$Fn_{3S}$ | Percent thrust through third stream | about 1% to about 50%, such as about 3% to about 30%, such as about 5% to about 20%, such as at least about 7%, such as at least about 10%, such as at least about 15%, and below about 50% |

Figure 3:
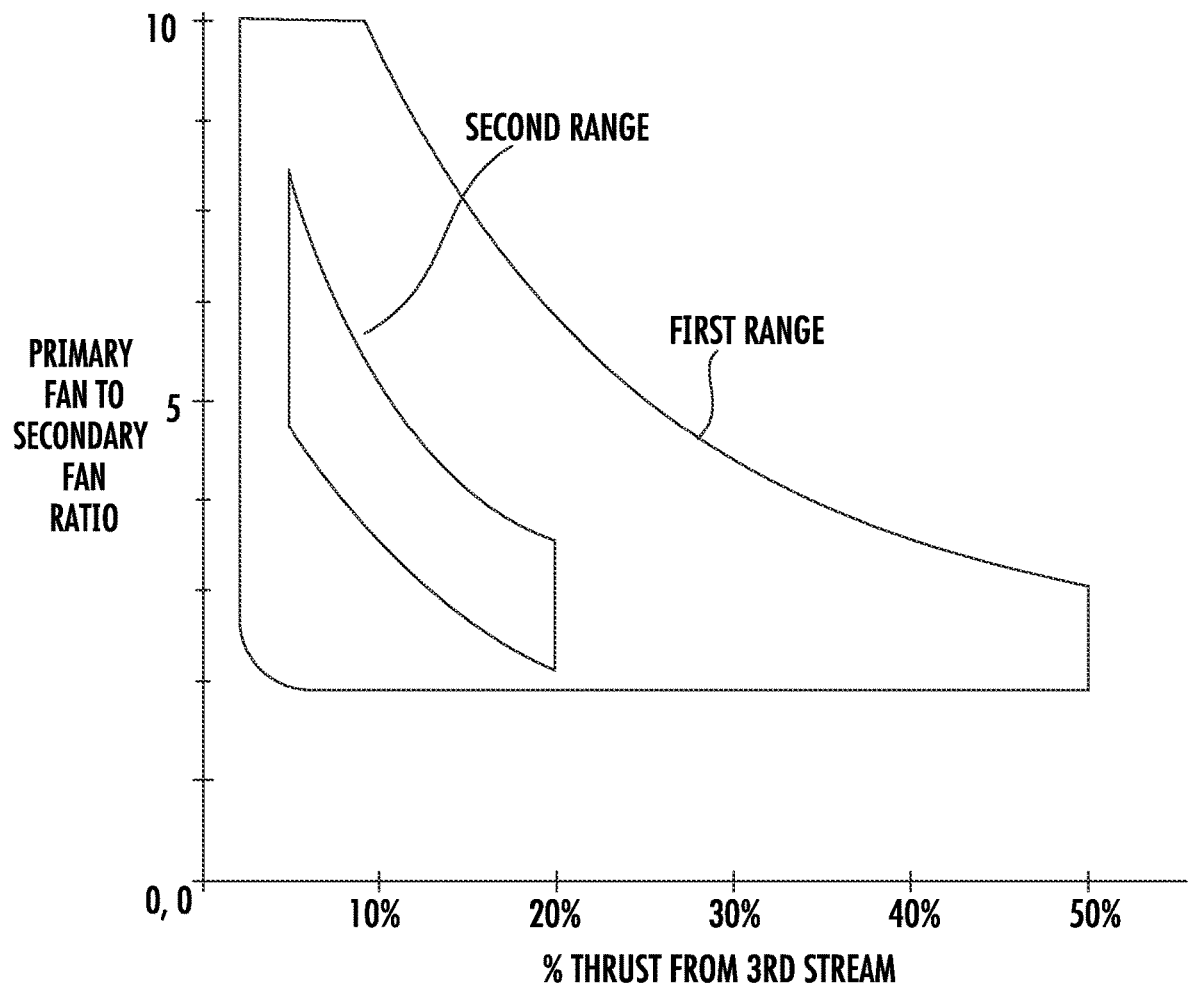
FIG. 3 is a graph depicting a range of radius ratios ($R_1$ over $R_3$) to percent thrust of the third stream in accordance with various example embodiments of the present disclosure.

FIGS. 2A through 2D and 3 illustrate gas turbine engines in accordance with one or more exemplary embodiments of the present disclosure, showing the relationships between the tip radius ratio and percent thrust through the third stream. In particular, FIGS. 2A through 2D provides a table including numerical values corresponding to several of the plotted gas turbine engines in FIG. 3. FIG. 3 is a plot of gas turbine engines in accordance with one or more exemplary embodiments of the present disclosure, showing the relationships between the tip radius ratio ($R_1$ to $R_3$; Y-Axis) and the percent thrust through the third stream (% $Fn_{3S}$; X-Axis).

Notably, in FIG. 3, a first range and a second range are provided. The first range may correspond to an EFP of between 1.5 and 11, with % $Fn_{3S}$ equal to between about 2% and about 50%. Such may result in an engine having a desired propulsive efficiency.

The second range may correspond to an EFP of about 2.5 and about 4, with % $Fn_{3S}$ equal to between about 5% and about 20%. Such may result in an engine having a more preferred propulsive efficiency.

As will be appreciated from the description herein, various embodiments of a gas turbine engine are provided. Certain of these embodiments may be an unducted, single rotor gas turbine engine, or a ducted turbofan engine. An example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least about 300 degrees, such as at least about 330 degrees).

In one or more of these embodiments, a threshold power or disk loading for a fan (e.g., an unducted single rotor or primary forward fan) may range from 25 horsepower per square foot (hp/ft$^2$) or greater at cruise altitude during a cruise operating mode. In particular embodiments of the engine, structures and methods provided herein generate power loading between 80 hp/ft$^2$ and 160 hp/ft$^2$ or higher at cruise altitude during a cruise operating mode, depending on whether the engine is an open rotor or ducted engine.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration may be configured to generate at least about 25,000 pounds and less than about 80,000 of thrust during operation at a rated speed, such as between about 25,000 and 50,000 pounds of thrust during operation at a rated speed, such as between about 25,000 and 40,000 pounds of thrust during operation at a rated speed.

In various exemplary embodiments, the fan may include twelve (12) fan blades. From a loading standpoint, such a blade count may allow a span of each blade to be reduced such that the overall diameter of the primary fan may also be reduced (e.g., to about twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between about 1 and 10, or 2 and 7, or at least about 3.3, at least about 3.5, at least about 4 and less than or equal to about 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 rpm at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, LID core is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures at the core engine and the than. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine in the embodiments depicted above, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine defining a centerline and a circumferential direction, the gas turbine engine comprising: a turbomachine comprising a compressor section, a combustion section, and a turbine section arranged in serial flow order, the turbomachine defining a working gas flowpath and a fan duct flowpath; a primary fan driven by the turbomachine defining a primary fan tip radius $R_1$ and a primary fan hub radius $R_2$; a secondary fan located downstream of the primary fan and driven by the turbomachine, at least a portion of an airflow from the primary fan configured to bypass the secondary fan, the secondary fan defining a secondary fan tip radius $R_3$ and a secondary fan hub radius $R_4$, wherein the secondary fan is configured to provide a fan duct airflow through the fan duct flowpath during operation to generate a fan duct thrust, wherein the fan duct thrust is equal to % $Fn_{3S}$ of a total engine thrust during operation of the gas turbine engine at a rated speed during standard day operating conditions; wherein a ratio of $R_1$ to $R_3$ equals $$\sqrt{(EFP)\frac{(1 - RqR_{Sec.-Fan}^2)}{(1 - RqR_{Prim.-Fan}^2)}\left(\frac{1}{\% \; Fn_{3S}} - 1\right)};$$

wherein EFP is between 1.5 and 11, wherein $RqR_{Prim.-Fan}$ is a ratio of $R_1$ to $R_2$, and wherein $RqR_{Sec.-Fan}$ is a ratio of $R_3$ to $R_4$.

The gas turbine engine of one or more of these clauses, wherein the ratio of $R_1$ to $R_3$ is between about 2 and about 10, such as between about 2 and about 7.

The gas turbine engine of one or more of these clauses, wherein the ratio of R1 to R3 is between about 3 and about 5.

The gas turbine engine of one or more of these clauses, wherein EFP is between about 2.5 and about 4, and wherein % Fn3S is greater than or equal to about 5% and less than or equal to about 20%.

The gas turbine engine of one or more of these clauses, wherein RqRPrim.-Fan is between 0.2 and 0.4.

The gas turbine engine of one or more of these clauses, wherein RqRPrim.-Fan is between 0.25 and 0.35.

The gas turbine engine of one or more of these clauses, wherein RqRSec.-Fan is between 0.2 and 0.7.

The gas turbine engine of one or more of these clauses, wherein RqRSec.-Fan is between 0.35 and 0.5.

The gas turbine engine of one or more of these clauses, wherein EFP is between A2 and B2, wherein the primary fan defines a primary fan corrected tip speed during operation of the gas turbine engine at the rated speed during standard day operating conditions, wherein the secondary fan defines a secondary fan corrected tip speed during operation of the gas turbine engine at the rated speed during standard day operating conditions, wherein the primary fan corrected tip speed is between 500 feet per second and 2,000 feet per second, and wherein the secondary fan corrected tip speed is between 500 feet per second and 2,000 feet per second.

The gas turbine engine of one or more of these clauses, wherein % Fn3S is between 1% and 50%.

The gas turbine engine of one or more of these clauses, wherein % Fn3S is between 3% and 30%.

The gas turbine engine of one or more of these clauses, wherein % Fn3S is between 5% and 20%.

The gas turbine engine of one or more of these clauses, wherein the fan duct flowpath defines an outlet, and wherein the gas turbine engine further comprises: a variable geometry component associated with the secondary fan, wherein the variable geometry component is a stage of variable inlet guide vanes located immediately upstream of the secondary fan, a variable exhaust nozzle located at the outlet of the fan duct flowpath, or both.

The gas turbine engine of one or more of these clauses, wherein the primary fan is an unducted fan.

The gas turbine engine of one or more of these clauses, wherein the gas turbine engine defines a bypass airflow passage, wherein the primary fan is configured to provide a first portion of a primary fan airflow to the bypass airflow passage and a second portion of the primary fan airflow to the secondary fan, and wherein the secondary fan is configured to provide a first portion of a secondary fan airflow to the fan duct flowpath as the fan duct airflow and a second portion of the secondary fan airflow to the working gas flowpath.

The gas turbine engine of one or more of these clauses, further comprising: a heat exchanger positioned in thermal communication with the fan duct flowpath.

The gas turbine engine of one or more of these clauses, further comprising: an array of inlet guide vanes located immediately upstream of the secondary fan.

The gas turbine engine of one or more of these clauses, further comprising: an array of outlet guide vanes located immediately downstream of the secondary fan and upstream of the fan duct.

The gas turbine engine of one or more of these clauses, further comprising: a variable geometry exhaust nozzle located at an exit of the fan duct.

The gas turbine engine of one or more of these clauses, further comprising: a fan cowl surrounding the secondary fan located downstream of the primary fan, the fan cowl defining in part an engine inlet located downstream of the primary fan; wherein the turbomachine further comprises a core cowl surrounding at least in part the compressor section, the combustion section, and the turbine section, and wherein the fan duct is defined between the core cowl and the fan cowl.

I claim:

1. A gas turbine engine defining a centerline and a circumferential direction, the gas turbine engine comprising:
    a turbomachine comprising a compressor section, a combustion section, and a turbine section arranged in serial flow order, the turbomachine defining a working gas flowpath and a fan duct flowpath;
    a primary fan driven by the turbomachine defining a primary fan tip radius $R_1$ and a primary fan hub radius $R_2$;
    a secondary fan located downstream of the primary fan and driven by the turbomachine, at least a portion of an airflow from the primary fan configured to bypass the secondary fan, the secondary fan defining a secondary fan tip radius $R_3$ and a secondary fan hub radius $R_4$, wherein the secondary fan is configured to provide a fan duct airflow through the fan duct flowpath during operation to generate a fan duct thrust, wherein the fan duct thrust is equal to % $Fn_{3S}$ of a total engine thrust during operation at a rated speed during standard day operating conditions;
    wherein a ratio of $R_1$ to $R_3$ equals $$\sqrt{(EFP)\frac{(1-RqR_{Sec.-Fan}^2)}{(1-RqR_{Prim.-Fan}^2)}\left(\frac{1}{\%\ Fn_{3S}}-1\right)};$$

wherein EFP is between 1.5 and 11, wherein $RqR_{Prim.-Fan}$ is a ratio of $R_1$ to $R_2$, and wherein $RqR_{Sec.-Fan}$ is a ratio of $R_3$ to $R_4$.

2. The gas turbine engine of claim 1, wherein the ratio of $R_1$ to $R_3$ is between about 2 and about 10.

3. The gas turbine engine of claim 1, wherein the ratio of $R_1$ to $R_3$ is between about 3 and about 7.

4. The gas turbine engine of claim 1, wherein EFP is between about 2.5 and about 4, and wherein % $Fn_{3S}$ is greater than or equal to about 5% and less than or equal to about 20%.

5. The gas turbine engine of claim 1, wherein $RqR_{Prim.-Fan}$ is between 0.2 and 0.4.

6. The gas turbine engine of claim 1, wherein $RqR_{Prim.-Fan}$ is between 0.25 and 0.35.

7. The gas turbine engine of claim 1, wherein $RqR_{Sec.-Fan}$ is between 0.2 and 0.7.

8. The gas turbine engine of claim 1, wherein $RqR_{Sec.-Fan}$ is between 0.35 and 0.5.

9. The gas turbine engine of claim 1, wherein EFP is between A2 and B2, wherein the primary fan defines a primary fan corrected tip speed during operation of the gas turbine engine at the rated speed during standard day operating conditions, wherein the secondary fan defines a secondary fan corrected tip speed during operation of the gas turbine engine at the rated speed during standard day operating conditions, wherein the primary fan corrected tip speed is between 500 feet per second and 2,000 feet per second, and wherein the secondary fan corrected tip speed is between 500 feet per second and 2,000 feet per second.

10. The gas turbine engine of claim 1, wherein % $Fn_{3S}$ is between 1% and 50%.

11. The gas turbine engine of claim 1, wherein % $Fn_{3S}$ is between 3% and 30%.

12. The gas turbine engine of claim 1, wherein % $Fn_{3S}$ is between 5% and 20%.

13. The gas turbine engine of claim 1, wherein the fan duct flowpath defines an outlet, and wherein the gas turbine engine further comprises:
    a variable geometry component associated with the secondary fan, wherein the variable geometry component is a stage of variable inlet guide vanes located immediately upstream of the secondary fan, a variable exhaust nozzle located at the outlet of the fan duct flowpath, or both.

14. The gas turbine engine of claim 1, wherein the primary fan is an unducted fan.

15. The gas turbine engine of claim 14, wherein the gas turbine engine defines a bypass airflow passage, wherein the primary fan is configured to provide a first portion of a primary fan airflow to the bypass airflow passage and a second portion of the primary fan airflow to the secondary fan, and wherein the secondary fan is configured to provide a first portion of a secondary fan airflow to the fan duct flowpath as the fan duct airflow and a second portion of the secondary fan airflow to the working gas flowpath.

16. The gas turbine engine of claim 1, further comprising:
a heat exchanger positioned in thermal communication with the fan duct flowpath.

17. The gas turbine engine of claim 1, further comprising:
an array of inlet guide vanes located immediately upstream of the secondary fan.

18. The gas turbine engine of claim 17, further comprising:
an array of outlet guide vanes located immediately downstream of the secondary fan and upstream of the fan duct.

19. The gas turbine engine of claim 1, further comprising:
a variable geometry exhaust nozzle located at an exit of the fan duct.

20. The gas turbine engine of claim 1, further comprising:
a fan cowl surrounding the secondary fan located downstream of the primary fan, the fan cowl defining in part an engine inlet located downstream of the primary fan;
wherein the turbomachine further comprises a core cowl surrounding at least in part the compressor section, the combustion section, and the turbine section, and wherein the fan duct is defined between the core cowl and the fan cowl.

21. A gas turbine engine defining a centerline and a circumferential direction, the gas turbine engine comprising:
a turbomachine comprising a compressor section, a combustion section, and a turbine section arranged in serial flow order, the turbomachine defining a working gas flowpath and a fan duct flowpath;
a primary fan driven by the turbomachine defining a primary fan tip radius $R_1$ and a primary fan hub radius $R_2$;
a secondary fan located downstream of the primary fan and driven by the turbomachine, at least a portion of an airflow from the primary fan configured to bypass the secondary fan, the secondary fan defining a secondary fan tip radius $R_3$ and a secondary fan hub radius $R_4$, wherein the secondary fan is configured to provide a fan duct airflow through the fan duct flowpath during operation to generate a fan duct thrust, wherein the fan duct thrust is equal to % $Fn_{3,S}$ of a total engine thrust during operation of the gas turbine engine at a rated speed during standard day operating conditions;
wherein a ratio of $R_1$ to $R_3$ is between 2 and 7.

* * * * *